United States Patent
Jeong

(10) Patent No.: US 9,436,309 B2
(45) Date of Patent: Sep. 6, 2016

(54) LIQUID CRYSTAL DISPLAY DEVICE INTEGRATED WITH TOUCH SCREEN PANEL

(71) Applicant: Samsung Display Co., Ltd., Yongin (KR)

(72) Inventor: Wee-Joon Jeong, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 11 days.

(21) Appl. No.: 14/469,912

(22) Filed: Aug. 27, 2014

(65) Prior Publication Data

US 2016/0062523 A1 Mar. 3, 2016

(30) Foreign Application Priority Data

Sep. 5, 2013 (KR) .................. 10-2013-0106454

(51) Int. Cl.
G06F 3/041 (2006.01)
G06F 3/044 (2006.01)
G02F 1/1333 (2006.01)
G02F 1/1335 (2006.01)

(52) U.S. Cl.
CPC ........... *G06F 3/0412* (2013.01); *G02F 1/1336* (2013.01); *G02F 1/13338* (2013.01); *G02F 1/133308* (2013.01); *G02F 1/133602* (2013.01); *G06F 3/044* (2013.01); *G02F 2001/133317* (2013.01); *G02F 2001/133613* (2013.01); *G02F 2201/46* (2013.01); *G06F 2203/04112* (2013.01)

(58) Field of Classification Search
CPC ............................... G02C 7/083; G02C 7/022
USPC ............................................................ 349/58
See application file for complete search history.

(56) References Cited

U.S. PATENT DOCUMENTS

| 7,444,717 | B2 | 11/2008 | Liu et al. | |
|---|---|---|---|---|
| 7,551,241 | B2 | 6/2009 | Fukuda | |
| 7,946,758 | B2 | 5/2011 | Mooring | |
| 8,250,724 | B2 | 8/2012 | Dabov et al. | |
| 2002/0154474 | A1* | 10/2002 | Merz ................. | G02F 1/133308 361/679.55 |
| 2008/0129915 | A1* | 6/2008 | Fukuda ............. | G02F 1/133308 349/58 |
| 2009/0207560 | A1* | 8/2009 | Lee ...................... | H01L 51/5237 361/679.01 |
| 2011/0193800 | A1* | 8/2011 | Son ..................... | G06F 3/03547 345/173 |

(Continued)

FOREIGN PATENT DOCUMENTS

| JP | WO2013/061795 | * 5/2013 | ............... G09F 9/00 |
|---|---|---|---|
| JP | WO2013/187281 | * 12/2013 | ........... G02F 1/1333 |

(Continued)

OTHER PUBLICATIONS

"Embedded Touchscreen Technology and Market," Apr. 2010, Research File: 966152, Displaybank Co., Ltd., pp. 1-30.

*Primary Examiner* — Sang V Nguyen
(74) *Attorney, Agent, or Firm* — H.C. Park & Associates, PLC

(57) ABSTRACT

A liquid crystal display device integrated with a touch screen panel includes a liquid crystal panel, a touch screen panel, a backlight unit, a mold frame and a fixing member. The liquid crystal panel displays an image. The touch screen panel is provided on a front side of the liquid crystal panel. The backlight unit irradiates light onto the liquid crystal panel. The mold frame accommodates and supports the liquid crystal panel and the backlight unit. The fixing member is fastened to one side of the mold frame to fix the touch screen panel on the liquid crystal panel.

12 Claims, 4 Drawing Sheets

(56) References Cited

U.S. PATENT DOCUMENTS

| | | | | |
|---|---|---|---|---|
| 2012/0099261 | A1* | 4/2012 | Reber | G06F 1/1632 361/679.3 |
| 2012/0242926 | A1* | 9/2012 | Hsu | G02F 1/133308 349/58 |
| 2013/0057484 | A1 | 3/2013 | Chiu et al. | |
| 2014/0267957 | A1* | 9/2014 | Iwamoto | H04N 5/64 349/12 |
| 2015/0168767 | A1* | 6/2015 | Yonemura | G02F 1/133308 349/58 |

FOREIGN PATENT DOCUMENTS

| KR | 10-2003-0081729 | 10/2003 |
|---|---|---|
| KR | 10-0922508 | 10/2009 |

* cited by examiner

LIQUID CRYSTAL DISPLAY DEVICE INTEGRATED WITH TOUCH SCREEN PANEL

CROSS REFERENCE TO RELATED APPLICATION

This application claims priority from and the benefit of Korean Patent Application No. 10-2013-0106454, filed on Sep. 5, 2013, which is hereby incorporated by reference for all purposes as if fully set forth herein.

BACKGROUND

1. Field

Exemplary embodiments of the present invention relate to a liquid crystal display device integrated with a touch screen panel.

2. Discussion of the Background

A liquid crystal display (LCD) device including a touch screen panel enables a user to perform an input operation with a finger or stylus on the touch screen panel without any auxiliary input means such as a keyboard or mouse. Accordingly, the liquid crystal display device is used in various fields including industrial spots, medical equipment, personal portable terminals, office automation devices, game industries, and the like.

SUMMARY

Exemplary embodiments of the present invention provide a liquid crystal display device integrated with a touch screen panel, which can minimize a defect that may occur in a rework operation.

Additional features of the invention will be set forth in the description which follows, and in part will be apparent from the description, or may be learned by practice of the invention.

An exemplary embodiment of the present invention discloses a liquid crystal display device integrated with a touch screen panel, including a liquid crystal panel configured to display an image; a touch screen panel provided on a front side of the liquid crystal panel; a backlight unit configured to irradiate light onto the liquid crystal panel; a mold frame configured to accommodate and support the liquid crystal panel and the backlight unit; and a fixing member fastened to one side of the mold frame to fix the touch screen panel on the liquid crystal panel.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE ILLUSTRATED EMBODIMENTS

Figure 1:
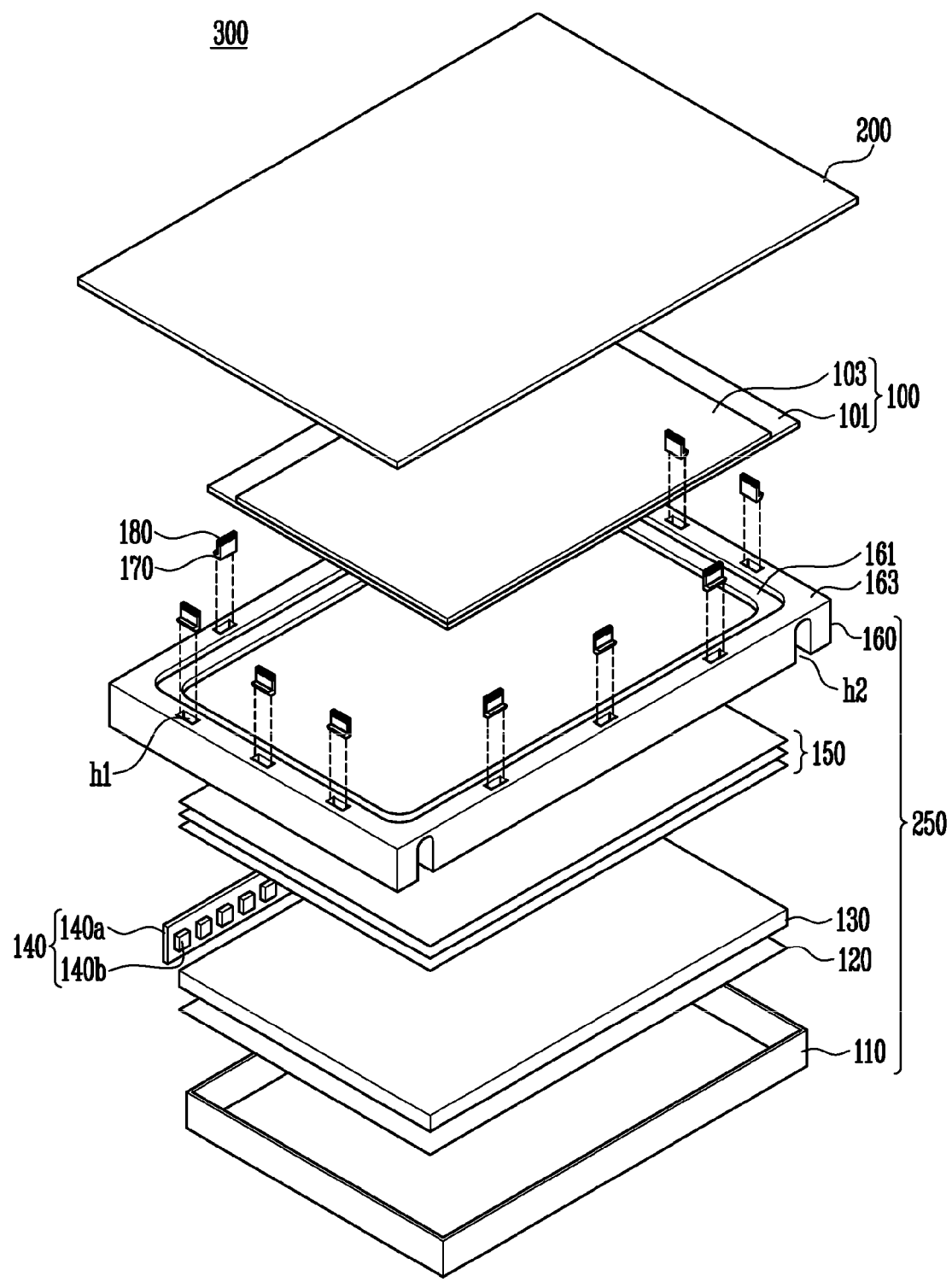
FIG. 1 is an exploded perspective view of a liquid crystal display device integrated with a touch screen panel according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In the drawings, the size and relative sizes of layers and regions may be exaggerated for clarity. Like reference numerals in the drawings denote like elements.

It will be understood that when an element or layer is referred to as being "on" or "coupled to" another element or layer, it can be directly on or directly coupled to the other element or layer, or intervening elements or layers may be present. In contrast, when an element is referred to as being "directly on" or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
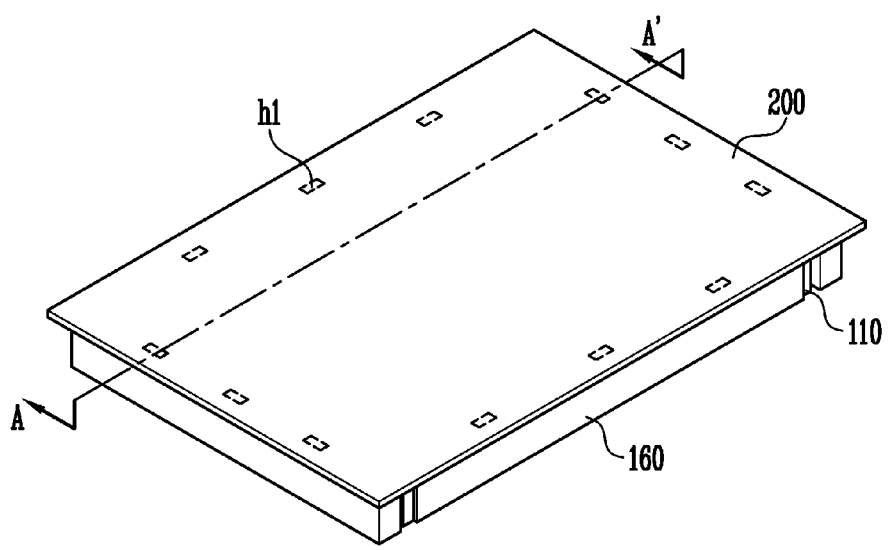
FIG. 2 is an assembled perspective view of the liquid crystal display device integrated with the touch screen panel of FIG. 1.

FIG. 1 is an exploded perspective view of a liquid crystal display device integrated with a touch screen panel according to an embodiment of the present invention. FIG. 2 is an assembled perspective view of the liquid crystal display device integrated with the touch screen panel of FIG. 1.

Referring to FIGS. 1 and 2, the liquid crystal display device 300 includes a liquid crystal panel 100 configured to display an image, a touch screen panel 200 disposed on the liquid crystal panel 100 through optical bonding, and a backlight unit 250 configured to provide light to the liquid crystal panel 100.

The liquid crystal panel 100 includes a first substrate 101 on which a plurality of pixels, each having a thin film transistor, is disposed, a second substrate 103 disposed on the first substrate 101, and a liquid crystal layer (not shown) disposed between the two substrates 101 and 103.

The first substrate 101 includes a plurality of pixels, each disposed in an area that may be defined by a plurality of data lines and a plurality of gate lines that intersect each other on a transparent substrate. A thin film transistor may be included in each pixel.

A source electrode of the thin film transistor may be coupled to a data line, and a drain electrode of the thin film transistor may be coupled to a pixel electrode disposed in each pixel. A gate electrode of the thin film transistor may be coupled to a gate line.

Switching on and off the thin film transistor may be determined by a gate signal supplied to the gate line. A data signal corresponding to each pixel may be applied to the pixel electrode through the source/drain electrode of the thin film transistor. The arrangement of liquid crystals may be changed by the data signal. Thus, the degree of transmission of light may be controlled.

The second substrate 103 may have red (R), green (G), and blue (B) color filters disposed in an area corresponding to each pixel, and a common electrode may be disposed on the front side of the color filters. Accordingly, light passing through the first substrate 101 and the liquid crystals may represent a specific color through the color filters. Gray scale may be expressed according to the degree of transmission of the light.

The liquid crystal panel 100 may be coupled to the backlight unit 250.

The touch screen panel 200 receives an external touch signal, and may be implemented using various touch sensitive methods, including an electrostatic capacitive method, a resistive overlay method, and many others.

The touch screen panel 200 may have a plate shape. The touch screen panel 200 may be disposed on the liquid crystal panel 100 through optical bonding.

Since the touch screen panel 200 may be larger than the liquid crystal panel 100, it may be difficult to fasten the touch screen panel 200 and the liquid crystal panel 100 together.

Thus, the touch screen panel 200 and the liquid crystal panel 100 may be coupled through the optical bonding. When optical bonding is used, a mechanism such as a top cover is not disposed on the touch screen panel, and hence, the outer bezel area of the liquid crystal display device 300 may be reduced in size.

The backlight unit 250 includes a light source unit 140 configured to generate light, a light guide plate 130 configured to irradiate the light generated in the light source unit 140 onto the liquid crystal panel 100, optical sheets 150 configured to improve characteristics of the light irradiated from the light guide plate 130, a mold frame 160 configured to surround and support the sides of the optical sheets 150, and a bottom cover 110 fastened to the mold frame 160 to accommodate the light guide plate 130 and the optical sheets 150 therein.

The backlight unit 250 further includes a reflection plate 120 disposed on a bottom surface of the light guide plate 130 to reflect light, thereby preventing the loss of light.

The light source unit 140 includes a light source 140$b$ configured to generate light, and a printed circuit board 140$a$ having the light source 140$b$ mounted thereon.

Various types of light sources may be used as the light source 140$b$. For example, the light source 140$b$ may be any one of a light emitting diode (LED) chip or an LED package having at least one LED chip. Further, the light source 140$b$ may be configured with a colored LED or white LED that emits at least one color.

Although it has been described that the backlight unit 250 may be an edge-type backlight unit, a direct-type backlight unit may additionally or alternatively be used as the backlight unit 250.

The light guide plate 130 converts light incident from the light source 140$b$ into a surface light source, and guides the converted surface light source to the liquid crystal panel 100. Therefore, light cannot escape from the light guide plate 130 as long as the incident angle of the light is not changed.

Thus, a scattering pattern (not shown) that allows the angle of the incident light coming into the light guide plate 130 to become smaller than the critical angle of the light is disposed at a lower portion of the light guide plate 130. More specifically, this allows the light entering into the light guide plate 130 through the light entrance edge of the light guide plate 130 to advance toward an upper portion of the light guide plate 130.

The optical sheets 150 may include a diffusion sheet configured to prevent light from being condensed in a specific area by diffusing the light incident from the light guide plate 130. The optical sheets 150 may further include a prism sheet configured to increase the vertical luminance of the light through refraction and reflection. As one having ordinary skill in the art would appreciate, various other optical sheets may also be included.

The bottom cover 110 may include a bottom portion configured to sequentially accommodate the reflection plate 120, the light guide plate 130, and the optical sheets 150. The bottom cover 110 also may include a side portion extended from the bottom portion coupled to the mold frame 160.

The mold frame 160 may be quadrangular, and may further include an opening corresponding to the display area of the liquid crystal panel 100, and a side portion surrounding the opening portion. Thus, the mold frame 160 supports and accommodates the liquid crystal panel 100, the reflection plate 120, the light guide plate 130, and the optical sheets 150.

The mold frame 160 may be made of, for example, plastic, synthetic resin, or SUS steel. The mold frame 160 may be integrally injection-molded or extrusion-molded, in consideration of insulation properties, economic restrictions, or other needs of the specific application.

A side portion of the mold frame 160 may include a first mounting portion 161 on which the liquid crystal panel 100 is disposed, and a second mounting portion 163 on which the touch screen panel 200 attached on the liquid crystal panel 100 is disposed.

The mold frame 160 may include first grooves h1 positioned in the second mounting portion 163 to be spaced apart from each other and second grooves h2 coupled to the side portion of the bottom cover 110.

The liquid crystal display device 300 may include fixing members 170 inserted into the respective first grooves h1 of the mold frame 160. Fixing members 170 may fix the touch screen panel 200 on the mold frame 160.

The fixing members 170 may be coupled to the respective first grooves h1 of the mold frame 160 to fix the touch screen panel 200 on the mold frame 160.

The fixing member 170 may be formed in the shape of a downwardly inclined hook so as to be easily inserted into the mold frame 160 while improving the coupling force with the mold frame 160. Thus, the fixing member 170 may be latched and coupled to the mold frame 160.

That is, the fixing member 170 may be formed in the shape of a hook protruding toward the outside of the mold frame 160, so fixing member 170 may be inserted and fixed into the first groove h1 of the mold frame 160.

The first groove h1 of the mold frame 160 may be configured with a hook groove corresponding to the hook-shaped fixing member 170. The number of the first grooves h1 may correspond with the number of fixing members 170.

The number of the fixing members 170 provided may be such that the fixing members 170 are respectively disposed at portions corresponding to the first grooves h1, and can sufficiently fix the touch screen panel 200 to the mold frame 160.

The fixing member 170 may be implemented with the same material as that of the mold frame 160. For example, the fixing member 170 may be made of a plastic material such as polycarbonate resin or any material appropriate for forming the fixing members.

The liquid crystal display device 300 may further include adhesive members 180 attached on the respective fixing members 170 to allow the fixing members 170 to be coupled to the touch screen panel 200.

In this case, the adhesive member 180 may include double-sided tape.

Figure 3:
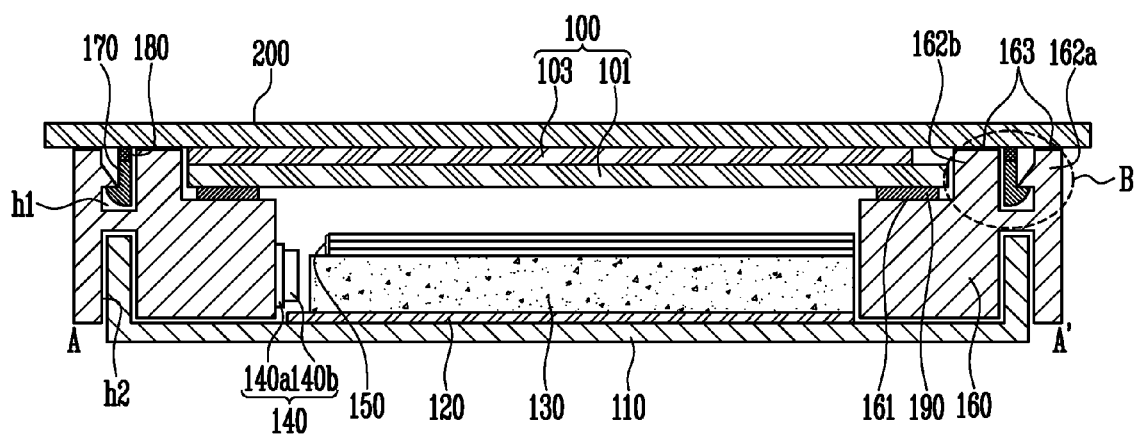
FIG. 3 is a sectional view taken along line A-A' in the liquid crystal display device integrated with the touch screen panel of FIG. 2.

FIG. 3 is a sectional view taken along line A-A' in the liquid crystal display device integrated with the touch screen panel of FIG. 2.

Referring to FIGS. 1 and 3, the liquid crystal panel 100 may be mounted on the first mounting portion 161 of the mold frame 160, and the touch screen panel 200 may be mounted on the second mounting portion 163 of the mold frame 160.

An impact absorbing member 190 made of silicon may be disposed on the first mounting portion 161.

The impact absorbing member 190 may prevent scratches or other damage which may occur in the liquid crystal panel 100 when the liquid crystal panel 100 is mounted on the mold frame 160. In addition, the impact absorbing member 190 prevents external vibration and impact from being transferred to the liquid crystal panel 100.

The second mounting portion 163 of the mold frame 160 includes first and second projections 162a and 162b divided by the first groove h1.

The first projection 162a forms one side of the second mounting portion 163, and supports a portion of the touch screen panel 200. The second projection 162b may be positioned at an inner side of the first projection 162a, and may form the other side of the second mounting portion 163. The second projection 162b may support a portion of the touch screen panel 200.

Figure 4A:
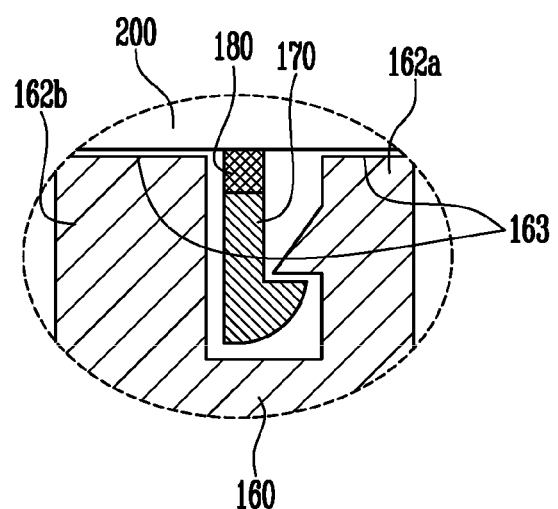
FIG. 4A is an enlarged view of portion B of FIG. 3.
Figure 4B:
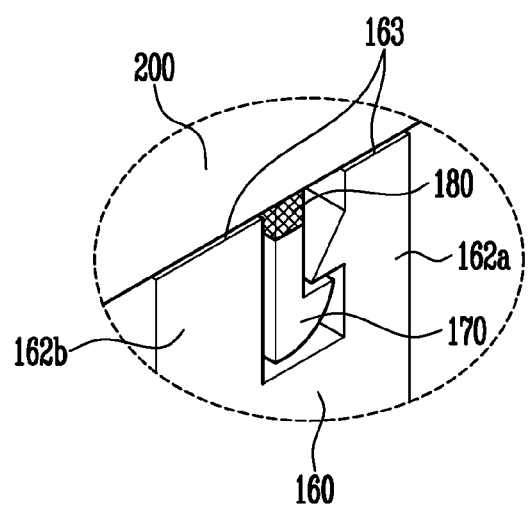
FIG. 4B is a side perspective view showing the portion B of FIG. 4A.

The first projection 162a, as shown in FIGS. 4A and 4B, may include a protruding portion protruded to face the second projection 162b. The protruding portion may include a latching member which can be latched and coupled to the fixing member 170 by being alternately arranged with the fixing member 170.

As described above, the fixing member 170 is inserted into the first groove h1 of the mold frame 160, to be latched and coupled to the protruding portion of the first projection 162a.

The adhesive member 180 is attached on the fixing member 170, and the touch screen panel 200 is disposed on the adhesive member 180. Thus, the touch screen panel 200 is mounted and fixed on the mold frame 160 by the fixing members 170 and the adhesive members 180.

The touch screen panel 200 may be disposed on the liquid crystal panel 100 through the optical bonding.

More specifically, the touch screen panel 200 disposed on the liquid crystal panel 100 may be mounted and fixed on the mold frame 160 through the adhesive members 180 and the fixing members 170.

In a case where an assembling defect of the backlight unit 250 occurs during the manufacturing process of the liquid crystal display, a rework operation is performed. The rework operation is an operation for solving the defect of the backlight unit 250 by separating the backlight unit 250 from the liquid crystal panel 100.

If the fixing member 170, which is latched and coupled to the first groove h1 of the mold frame 160, is forcibly separated from the first groove h1, the mold frame 160 may be separated from the liquid crystal panel 100. That is, if the fastening between the fixing member 170 and the first groove h1 is forcibly separated or otherwise released, the mold frame 160 may be easily separated from the liquid crystal panel 100.

Accordingly, a worker may easily solve the defect of the backlight unit 250 while it is separated from the liquid crystal panel 100. Then, backlight unit 250 can be refastened to the liquid crystal panel 100 through the fixing member 170, thereby integrating the liquid crystal display device with the touch screen panel.

As such, if the fastening between the fixing member 170 and the first groove h1 of the mold frame 160 is released or forcibly separated during the rework operation, the backlight unit 250 is easily separated from the liquid crystal panel 100 without any damage of the liquid crystal panel 100, so that it is possible to minimize damage that may occur during the rework operation.

Figure 5A:
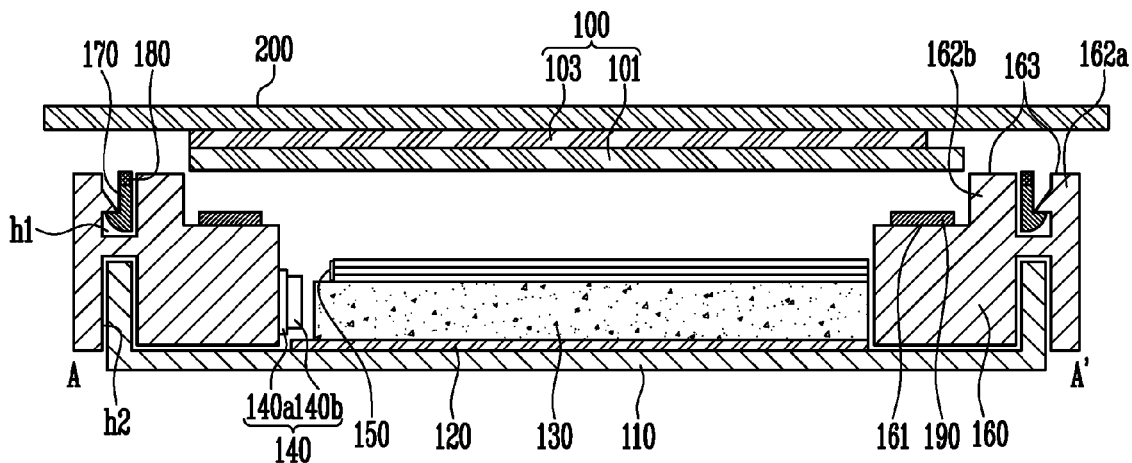
FIG. 5A is a sectional view showing a state in which a liquid crystal panel is coupled to the touch screen panel of FIG. 1.

FIG. 5A is a sectional view showing a state in which a liquid crystal panel is coupled to the touch screen panel of FIG. 1.

Referring to FIG. 5A, the fixing member 170 is inserted into the first groove h1 of the mold frame 160 to be latched and coupled to the protruding portion of the first projection 162a. In this manner, the fixing member 170 is fixed to the mold frame 160. The adhesive member 180 is disposed on the fixing member 170.

The touch screen panel 200 is disposed on the mold frame 160 into which the fixing member 170 is inserted. The touch screen panel 200 is disposed on the liquid crystal panel 100 through the optical bonding.

Figure 5B:
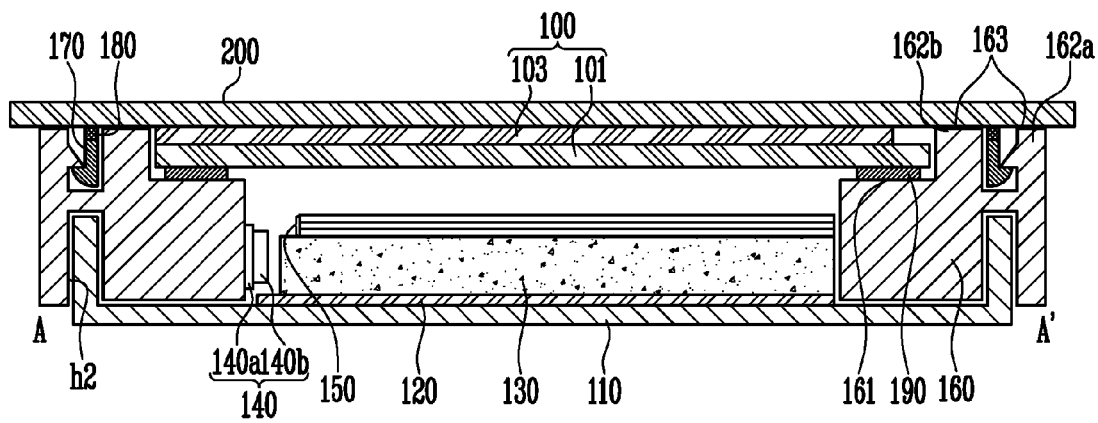
FIG. 5B is a sectional view showing a state in which the liquid crystal panel coupled to the touch screen panel is fixed to a mold frame.
Figure 5C:
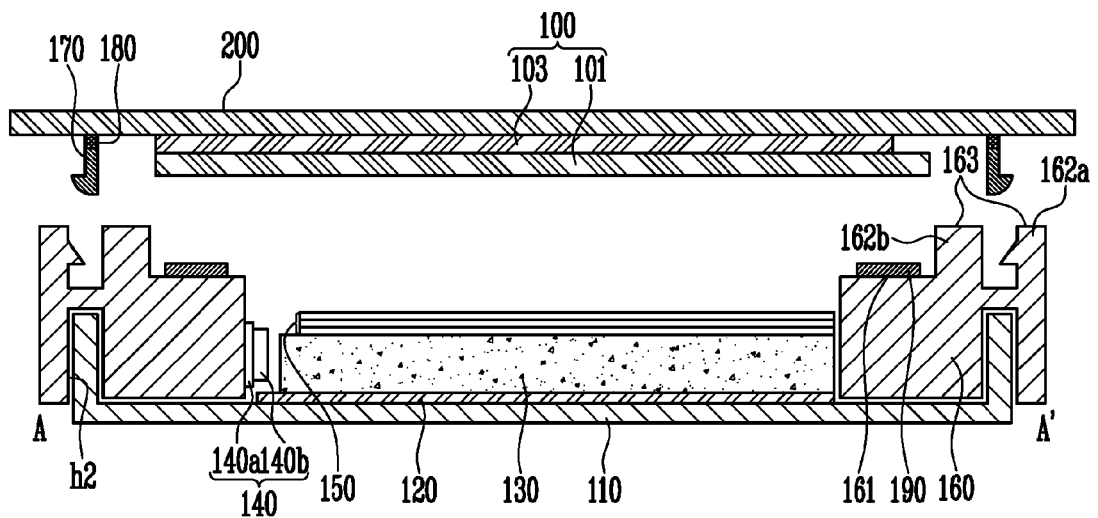
FIG. 5C is a sectional view showing a state in which the liquid crystal panel is separated from the mold frame.

FIG. 5B is a sectional view showing a state in which the liquid crystal panel coupled to the touch screen panel is fixed to the mold frame.

Referring to FIG. 5B, the liquid crystal panel 100 having the touch screen panel 200 attached thereto through the optical bonding is supported and disposed on the first mounting portion 161 of the mold frame 160.

The impact absorbing member 190 is disposed on the first mounting portion 161 of the mold frame 160, so as to prevent scratches that may occur when the liquid crystal panel 100 is mounted on the first mounting portion 161. This configuration also may prevent external impact and vibration from being transferred to the liquid crystal panel 100.

The touch screen panel 200 disposed on the liquid crystal panel 100 is, in turn, disposed on the fixing member 170. Fixing member 170 is inserted into the first groove h1 of the mold frame 160, and, thus, is fixed on the mold frame 160.

In the liquid crystal display device implemented in the manner described above, when a rework operation is performed due to the defect that occurs in the assembling of the liquid crystal display, the mold frame 160 may be separated from the liquid crystal panel 100 by releasing or forcibly separating the coupling between the fixing member 170 and the first groove h1 of the mold frame 160.

If the mold frame 160 is separated from the liquid crystal panel 100, the fixing member 170 is separated from the first groove h1. This occurs when the fixing member 170 is attached to one side of the touch screen panel 200 by the adhesive member 180.

As such, if the fastening between the fixing member 170 and the first groove h1 of the mold frame 160 is released or otherwise forcibly separated, the mold frame 160 may be easily separated from the liquid crystal panel 100 without damage to the liquid crystal panel 100, thereby enabling the rework operation to be easily performed.

By way of summation and review, in a liquid crystal display device including a touch screen panel, the touch screen panel is disposed on a liquid crystal panel through optical bonding. The touch screen panel and the liquid crystal panel, which are coupled as described above, are mounted and fixed on a mold frame, using a double-sided tape.

If an assembly defect of a backlight unit occurs during the process of manufacturing the liquid crystal display device, a rework operation may be performed, separating the backlight unit from the liquid crystal panel so the defect of the backlight unit can be remedied.

When the liquid crystal panel having the touch screen panel attached thereto is separated from the mold frame, a portion of the liquid crystal panel may be broken by the adhesion of the double-sided tape, and therefore, the liquid crystal panel may be rendered unusable.

That is, when the mold frame is separated from the liquid crystal panel during the rework operation, a portion of the liquid crystal panel having the double-sided tape attached there may be is broken due to a strong adhesion of the double-sided tape, and therefore, the liquid crystal panel may be rendered unusable. Accordingly, a new liquid crystal panel may be necessary to complete the device.

According to an embodiment of the present invention, it is possible to provide a liquid crystal display device integrated with a touch screen panel that minimizes the risk that a defect that may occur in a rework operation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display device integrated with a touch screen panel, comprising:
    a liquid crystal panel configured to display an image;
    a touch screen panel disposed on an upper side of the liquid crystal panel, the touch screen panel is directly disposed on the liquid crystal panel through optical bonding, and is an outermost element on the viewer's side;
    a backlight unit configured to provide light to the liquid crystal panel;
    a mold frame comprising a central hole through an entire thickness of the mold frame, a first mounting portion surrounding the central hole, and a second mounting portion surrounding the first mounting portion; and
    a fixing member is directly fastened to a side of the touch screen panel by an adhesive member,
    wherein:
    the liquid crystal panel is disposed on the first mounting portion and the touch screen panel is disposed on the second mounting portion; and
    the second mounting portion of the mold frame comprises a groove, the fixing member being detachably inserted into the groove.

2. The liquid crystal display device of claim 1, wherein the fixing member is hook-shaped.

3. The liquid crystal display device of claim 2, wherein a distal end of the hook-shaped fixing member is protruded outward at the one side of the mold frame.

4. The liquid crystal display device of claim 1, wherein the fixing member and the mold frame comprise the same material.

5. The liquid crystal display device of claim 1, wherein the fixing member comprises a plastic material.

6. The liquid crystal display device of claim 1, further comprising an adhesive member disposed between and contacting the fixing member and the touch screen panel.

7. The liquid crystal display device of claim 6, wherein the adhesive member comprises a double-sided tape.

8. The liquid crystal display device of claim 1, further comprising a latching member alternately disposed with the fixing member in the groove of the second mounting portion.

9. The liquid crystal display device of claim 8, wherein the latching member comprises a hook protruded inward from a surface of the second mounting portion.

10. The liquid crystal display device of claim 1, further comprising an impact-absorbing member disposed on the first mounting portion of the mold frame and configured to absorb an impact of the liquid crystal panel.

11. The liquid crystal display device of claim 10, wherein the impact-absorbing member comprises silicon.

12. The liquid crystal display device of claim 1, further comprising a bottom cover disposed at a lower portion of the mold frame and housing the liquid crystal panel and the backlight unit.

* * * * *